US010459451B2

(12) United States Patent
Hillen et al.

(10) Patent No.: US 10,459,451 B2
(45) Date of Patent: Oct. 29, 2019

(54) METHOD FOR PROCESSING A FLOOR

(71) Applicant: Vorwerk & Co. Interholding GmbH, Wuppertal (DE)

(72) Inventors: Lorenz Hillen, Wuppertal (DE); Martin Meggle, Herzebrock (DE)

(73) Assignee: Vorwerk & Co. Interholding GmbH, Wuppertal (DE)

( * ) Notice: Subject to any disclaimer, the term of this patent is extended or adjusted under 35 U.S.C. 154(b) by 107 days.

(21) Appl. No.: 15/564,525

(22) PCT Filed: Apr. 4, 2016

(86) PCT No.: PCT/EP2016/057346
§ 371 (c)(1),
(2) Date: Oct. 5, 2017

(87) PCT Pub. No.: WO2016/162305
PCT Pub. Date: Oct. 13, 2016

(65) Prior Publication Data
US 2018/0074509 A1 Mar. 15, 2018

(30) Foreign Application Priority Data
Apr. 7, 2015 (DE) .................. 10 2015 105 211

(51) Int. Cl.
*G05D 1/02* (2006.01)
*G05D 1/00* (2006.01)

(52) U.S. Cl.
CPC ......... *G05D 1/0253* (2013.01); *G05D 1/0044* (2013.01); *G05D 1/0274* (2013.01); G05D 1/0248 (2013.01); G05D 2201/0203 (2013.01)

(58) Field of Classification Search
CPC ..................... G05D 1/0044; G05D 1/0274
(Continued)

(56) References Cited

U.S. PATENT DOCUMENTS

2011/0202175 A1* 8/2011 Romanov ........... A47L 11/4011
700/250
2014/0277900 A1* 9/2014 Abhyanker ............ G01C 21/32
701/25

FOREIGN PATENT DOCUMENTS

DE    10 2008 014 912 A1    9/2009
EP       0 363 339 A2        4/1990
(Continued)

OTHER PUBLICATIONS

International Search Report of PCT/EP2016/057346, dated Jul. 20, 2016.
(Continued)

*Primary Examiner* — Maceeh Anwari
(74) *Attorney, Agent, or Firm* — Collard & Roe, P.C.

(57) ABSTRACT

A method for processing, in particular cleaning, a floor of a room using an automatically movable processing device. A map of the room is generated and displayed to a user of the processing device, and the user can select at least one room sub-region in which the processing device is to process or refrain from processing the floor in the generated map. The aim of the invention is to provide a method for processing a floor, wherein the generated map of the room is easier to read for the user. This is achieved in that the map of the room is generated from three-dimensional coordinates of a world coordinate system, each point of a plurality of points of the room and/or of an obstacle arranged in the room being assigned to a three-dimensional coordinate within the world coordinates system.

9 Claims, 2 Drawing Sheets

Figure 1:
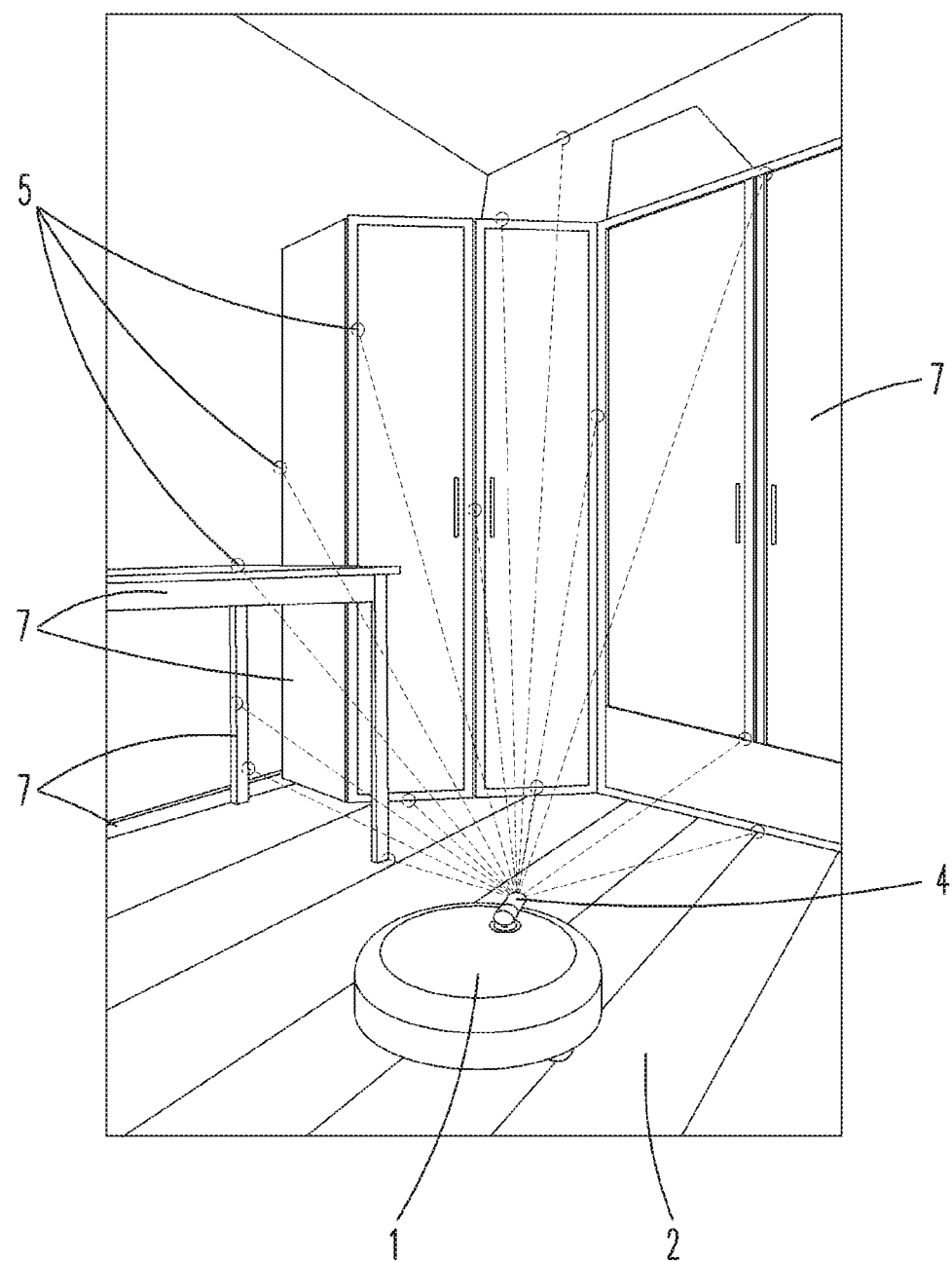

(58) Field of Classification Search
USPC .......................................................... 701/28
See application file for complete search history.

(56) References Cited

FOREIGN PATENT DOCUMENTS

| | | |
|---|---|---|
| EP | 2 407 847 A2 | 1/2012 |
| GB | 2 509 814 A | 7/2014 |
| WO | 2010/114235 A1 | 10/2010 |

OTHER PUBLICATIONS

Response of the German Patent Attorney dated Apr. 21, 2017 to the European Office Action dated Mar. 10, 2017 in PCT/EP2016/057346, with English translation of relevant parts.
Cited passages from R Siegwart: "introduction to autonomous mobile robots", Jan. 1, 2004 (Jan. 1, 2004), XP055054850, Massachusetts. ISBN: 978-0-26-219502-7 Retrieved from the Internet: URL:http://www.ee.ui.ac.id/muis/course_file/robotics/Introduction_to_Autonomous_Mobile_Robots.pdf, pp. 108 and 111-112.

* cited by examiner

METHOD FOR PROCESSING A FLOOR

CROSS REFERENCE TO RELATED APPLICATIONS

This application is the National Stage of PCT/EP2016/057346 filed on Apr. 4, 2016, which claims priority under 35 U.S.C. § 119 of German Application No. 10 2015 105 211.3 filed on Apr. 7, 2015, the disclosures of which are incorporated by reference. The international application under PCT article 21(2) was not published in English.

The invention relates to a method for processing, in particular for cleaning, a floor of a room using an automatically movable processing device, wherein a map of the room is generated and displayed to a user of the processing device, wherein the user can select at least one sub-region of the room, in which the processing device is to process or refrain from processing the floor, in the generated map, wherein the map of the room is generated from three-dimensional coordinates of a world coordinate system, wherein a three-dimensional coordinate within the world coordinate system is assigned to each point of a plurality of points of the room and/or of an obstacle arranged in the room.

Methods of the above-mentioned type are well known in the prior art. The processing device used in particular for cleaning moves automatically according to a preprogrammed driving and processing strategy, if applicable. It is known in this context that the processing device has a map or map-like representation of the room to be processed, if applicable a plurality of maps for a plurality of rooms. This map is preferably stored in a nonvolatile data storage. In particular the position data of obstacles, for example boundary walls or also furniture, is noted in the map or map-like representation of the room.

To generate the map, it is known to move the processing device in the course of a learning drive. The map can likewise also be generated or supplemented in the course of a processing drive.

Different means for capturing the room are known in the prior art. DE 10 2008 014 912 A1 discloses for example a cleaning device comprising an omnidirectional scanner for detecting obstacles. The obstacle detection is based on an optical triangulation method, which measures distances to obstacles.

Publication EP 2407847 A2 for example discloses an automatically movable device as well as a method for the orientation of such a device, in the case of which a two-dimensional map is \generated from an omnidirectional distance measurement of a distance sensor, wherein further information, which serve to divide the 2D map into sub-regions, are supplemented. The further information is for example measured ceiling heights, which serves to identify room transitions, and which thus facilitates the interpretation of the map for a user.

It is moreover also known in the prior art to generate maps of pictures, which are assembled in a mosaic-like manner, which were taken with a camera arranged on the cleaning device.

Even though a map of the room can be generated with the known methods, this map is difficult to read for the user. This is so, because the obstacles are represented from the perspective of the processing device. Typically, this perspective is not identical with the perspective of the user, who for example does not only perceive the legs of a table as obstacle, but in fact the table as a whole, that is, also the table top. In this respect, it is difficult for the user to orientate himself in a map, in which only the table legs are shown as obstacles.

It is thus the object of the invention to create a method for processing a floor, in the case of which the generated map of the room is easier to read for the user.

As solution, the invention proposes for the map to be displayed as two-dimensional map comprising coded, in particular color coded, height information, wherein the height information is a height information of an obstacle, and wherein the codes of obstacles of different heights differ.

In contrast to the prior art, a map of three-dimensional coordinates of a world coordinate system, which represents the actual dimensions of an obstacle, including the height thereof, is now generated by means of the method according to the invention. The room is thus not represented from the perspective of the processing device, which generates the map, but in fact so as to be independent from the perspective. It is thus possible to the user of the processing device in a particularly simple manner to recognize the actual room situation by means of the obstacles represented in the map, and to make a quick and reliable selection of the sub-regions of the room, which are to be left out of the processing or which are to be considered for a processing. In this respect, a new map is created, which can be used by a user of the processing device to navigate the processing device within the room or within a plurality of rooms, respectively, as well as for the user-friendly, uncomplicated interaction.

Advantageously, the map is displayed as two-dimensional map comprising coded, in particular color-coded, height information. The setup of this map thereby requires a discretization of the three-dimensional coordinates and the projection onto the plane of the floor of the room. Depending on the distance of the corresponding coordinates to this floor plane, the obstacles can be grouped into different classes. A first class can for example include obstacles close to the floor, which are not accessible to the processing device. These obstacles have an elevation of smaller than or equal to the height of the processing device. Such obstacles are represented in the map with a first color. A second class includes the accessible obstacles. Such obstacles can be accessed by the processing device and have an elevation, which is larger than the height of the processing device. A second color is assigned to these obstacles in the map. A third class of obstacles includes transitions between a wall of the room and a room ceiling. These transitions are identified by a very large elevation, which, as a rule, is constant across the room. A third color is assigned to these obstacles. This color coding of the obstacles results in helpful additional information for the user within the two-dimensionally represented map, which makes it possible to the user to also identify the third dimension of the obstacles and to thus orientate himself in the map. As an alternative to the color coding, other codes can be used as well, for example the use of geometric symbols (triangles, circles, etc.) or the addition of numerals as height information.

It is proposed for the room to be measured using a three-dimensionally pivotable laser distance sensor, which is arranged on the processing device. The laser distance sensor can in particular be a triangulation sensor, which measures the distances to obstacles, such as, for example, furniture or walls, using a triangulation method, from different distances to the obstacles. According to the invention, the laser distance sensor thereby does not only have a single measuring plane. Instead, the laser distance sensor can be pivoted three-dimensionally within the room to be measured, so that the height of obstacles can also be determined.

Moreover, it is proposed for the room to be measured with a camera, which is arranged on the processing device. Advantageously, such a camera is a digital camera, which has a CCD chip or CMOS chip. For evaluation purposes, the camera can transmit the digital pictures, which were taken, to an evaluating unit, in which the pictures are evaluated with respect to obstacles. The camera can either be used alone or also in combination with a laser distance sensor to measure the room. The map can thereby be generated by the combination of the data from the laser distance sensor and the data from the camera. The laser distance sensor can for example only measure distances to obstacles within a horizontal plane of the room, while the camera measures the height of the obstacles with respect to a vertical plane. The measuring values can be combined to three-dimensional coordinates of a world coordinate system. In this regard, this solution represents an alternative to the above-mentioned measurement using a three-dimensionally pivotable laser distance sensor.

It is furthermore proposed for a first picture of the camera to be taken from a first room position of the processing device, and for a second picture to be taken from a second room position of the processing device, wherein picture data contained in the first picture and the second picture are reduced to a plurality of points and/or lines, in particular using an edge detection. During a learning drive and/or processing drive of the processing device, pictures can be taken with the camera in regular intervals, chronologically and/or spatially. A first picture is thereby taken from a first room position, a second picture from a second room position, a third picture from a third room position, and so on. This results in a series of pictures, which displays the room as completely as possible and thus makes it possible to generate a map without any gaps.

As an alternative to the taking of pictures from a first and a second room position, a stereo vision camera can be used, which takes two pictures at a room position from different viewing angles. It is thus possible to calculate the room position and to determine three-dimensional coordinates for this purpose without changing the room position of the processing device. The viewing angle-dependent differences of the picture data of the two corresponding pictures are provided by the concrete embodiment and arrangement of the stereo vision camera on the processing device and are thus constant. In contrast to a measurement of two consecutive room positions, it is thus not required to determine a change of the room position from measuring values, which can on principle have measuring errors.

In the alternative, a room can moreover also be measured by means of a depth camera, which has a regular measuring grid. This measuring grid is projected into the detection region of the camera in the visible or invisible spectral range of the light and is reflected by the obstacles located in the detection region. The reflected signal is distorted as a function of the spatial arrangement and geometry of the obstacle, so that conclusions to the spatial orientation and position of the obstacle can be drawn by means of the depth information contained therein. A three-dimensional coordinate within the world coordinate system can, in turn, be determined therefrom.

In order to now be able to calculate consistencies between consecutive pictures in a subsequent operating step, distinctive features, such as for examples lines, edges or points, are initially sought within the pictures. Consistencies between immediately following pictures as well as between pictures which are chronologically and/or spatially further apart from one another, can be determined thereby. According to the invention, the information contained in the pictures is reduced to a plurality of points and/or lines. Typically, point features are evaluated in the picture processing, for example using a scale-invariant feature transformation (SIFT) or by means of so-called "Speeded Up Robust Features" (SURF). However, the evaluation of lines or edges, respectively, within the picture is also advantageous. Arbitrary edges (contrast transitions) are thereby initially detected in the picture. This can take place for example by means of a Canny algorithm. The edges detected in this manner are reduced to line segments in a subsequent step. The Hough transformation or alternatives thereof, for example probabilistic Hough transformation, is typically used for this purpose. The reduction of the pictures to a plurality of lines is made equally for the first picture and the second picture, or for further pictures, respectively. A comparison (matching) of the lines found in the pictures or of the beginning and end points, respectively, is carried out subsequently, in order to determine consistencies. This is typically carried out by means of a plausibility check, combined with the so-called RANSAC algorithm (Random Sample Consensus). The quality of the found consistencies is increased by elimination of faulty "consistencies".

In order to be able to now determine the three-dimensional coordinates within the world coordinate system, the invention proposes for the reduced picture data of the first picture and of the second picture to be compared to one another, wherein a three-dimensional coordinate of the world coordinate system is calculated by means of a distance between the first room position and the second room position covered by the processing device for each point and/or each line. The determination of the room positions themselves can thereby be carried out using a localization method, which is typically required in any event for navigating the processing device within the room. The distances covered by the processing device, that is, for example the distance between the first room position and the second room position of the processing device, can for example be calculated using odometry or vector subtraction. The combination of the picture data with the information relating to the distance covered between the two room positions makes it possible to calculate a three-dimensional coordinate of the world coordinate system for each point, in particular each starting and end point of a line. In order to be able to calculate the coordinates of a point with particularly high accuracy, the above-mentioned method steps can be carried out several times with different picture pairs. For example, not only the first and second picture of a picture series can thus be compared to one another, but for example also the first and the third picture, the first and the fourth picture, and so on. The calculated coordinates can be combined by means of averaging or by means of fusioning methods, for example a Kalman filter.

The distance between the first room position and the second room position can moreover be determined using a laser distance sensor, in particular a triangulation sensor, which is arranged on the processing device. A laser distance sensor, which is present on the processing device, can thereby be used in the usual manner in order to determine the distance to a second room position, based on a known first room position. In this respect, the measurements of a laser distance sensor in terms of the invention can be combined with the pictures from the camera in an advantageous manner.

It is proposed for the map to be displayed as grid map or line map. The three-dimensional coordinates of the world coordinate system are thereby transferred into a two-dimensional map of the room or of the rooms, respectively. The obstacles can thereby be represented within a grid. Moreover, it is possible for the contours of the obstacles to be represented by lines.

Moreover, it is proposed for the map of the room to be generated using an evaluating unit of the processing device. In this regard, the detection of the obstacles as well as the evaluation of the measured room coordinates is advantageously carried out using a mechanism of processing device, namely a laser distance sensor and/or a camera. A data transmission from the processing device to an external evaluating unit is not required.

In the alternative, provision can be made for the map of the room to be generated using an evaluating unit of a mobile end device, which is in data connection with the processing device, and/or using an evaluating unit, which is integrated in a data communications network. According to this process, an external evaluating unit is used to generate the map, so that the processing device itself does not need to have such an evaluating unit.

The display of the generated map can finally either be displayed on a display of the processing device itself or also on a display of an external device. For example, the external device can be a mobile end device of the user, in particular a mobile telephone or a laptop. In the alternative, the map can also be displayed on a television or other household appliances.

The invention will be discussed in more detail below by means of an exemplary embodiment.

Figure 2:
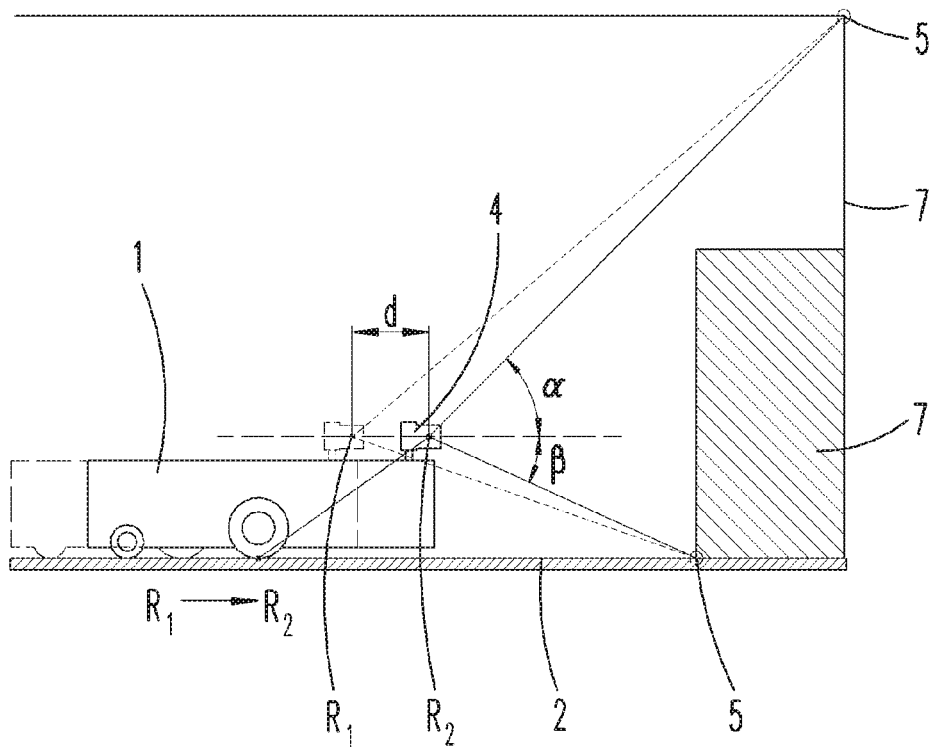
Figure 3:
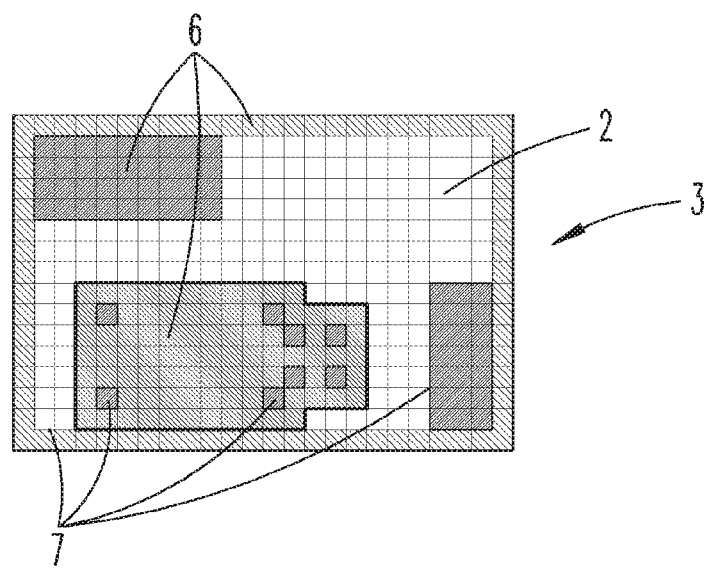

FIG. 1 shows a sub-region of a room comprising an automatically movable processing device, FIG. 2 shows a measuring of the room using the processing device from two consecutive room positions, FIG. 3 shows the generated map of a room.

The situation represented in FIG. 1 shows an automatically movable processing device 1, here for example a robotic vacuum cleaner, on a floor 2 of a room to be cleaned. The processing device 1 has a camera 4, which is arranged in the main moving direction of the processing device 1, so that the part of the room located in front of the processing device 1 can be measured. The represented room section comprises a plurality of obstacles 7, namely walls, baseboards, a table as well as cabinets. Obstacles 7 can be any type of objects, in particular those, which are not accessible by the processing device 1, because they have a distance to the floor 2, which is smaller than the height of the processing device 1. A user (not illustrated) can have a end device, which is in communication connection with the processing device 1, for example a mobile telephone, on which a generated map 3 of the room is displayed.

FIG. 2 shows the processing device 1 during a measuring of two obstacles 7 (wall, cabinet) from two different room positions, namely a first room position $R_1$ and a second room position $R_2$. A first measuring is thereby carried out from the room position $R_1$. A second measuring is carried out from the position $R_2$, which is offset from the first room position $R_1$ by a distance d.

FIG. 3 shows a generated map 3 of a room, which has height information 6 relating to the obstacles 7, wherein the height information 6 is color coded. The floor 2 and in each case also the obstacles 7 of different heights, are thereby represented in different colors.

The invention now works in such a way that the processing device 1 moves through the room during a learning run, that is, without simultaneously processing the floor 2, or also during a processing run, and takes pictures of the room from different room positions $R_1$, $R_2$ using the camera 4. In FIG. 1, the situation is represented by means of the first room position $R_1$ of the processing device 1. Such a picture is also taken in relation to the second room position $R_2$, which is spaced apart from the first room position $R_1$ by the distance d. This method step for example also includes a distortion correction of the pictures taken with the camera 4, in order to for example correct object distortions. During the learning run or also processing run of the processing device 1, pictures are taken at regular or irregular local distances d. In the alternative or in addition, provision can likewise also be made for the pictures to have a certain time distance to one another. As a whole, this thus results in a number of pictures (picture series), which were taken from different room positions $R_1$, $R_2$ to $R_n$.

Consistencies in the pictures, which were taken consecutively, are sought subsequently. For this purpose, edges are initially detected within the picture. These edges are for example edges of the table legs of the table, of the table top, edges of the cabinet, wall-ceiling transitions and so on. The edge detection can for example be carried out by means of a Canny algorithm. The detected edges of the obstacles 7 are then reduced to straight line segments. For example a probabilistic Hough transformation can be used for this purpose. Based on the straight lines obtained in this manner, consistencies between the pictures are then calculated. The pictures can either be pictures of two directly following room positions $R_1$, $R_2$ or also pictures of room positions, which do not follow directly, for example $R_1$ and $R_n$. To determine consistencies, in particular points 5, for example beginning and end points of the lines, are used. This is possible for example using a SIFT or SURF method.

The calculation of the three-dimensional coordinate is represented in FIG. 2 using the example of a wall-ceiling transition and of a floor-obstacle transition. In order to calculate the coordinates of these points 5, a picture is in each case taken from two consecutive room positions $R_1$, $R_2$ using the camera 4. The coordinates of the first room position $R_1$ or of the second room position $R_2$ of the processing device 1, respectively (or of the camera 4, respectively), are known, for example via a localization method, which is used routinely to navigate the processing device 1. The determination of the distance d between the first room position $R_1$ and the second room position $R_2$ can be calculated by using odometry or vector subtraction. Based on the room positions $R_1$ and $R_2$, angles $\alpha$, $\beta$ between a plane, which runs parallel to the floor 2, and the points 5 at the transitions wall/ceiling or floor/cabinet, respectively, are measured. The coordinates with regard to the room position $R_1$, $R_2$ of the camera 4 can be calculated from the amount of the distance d between the two room positions $R_1$, $R_2$ and the angles $\alpha$, $\beta$ for each of the room positions $R_1$, $R_2$. Due to the fact that the room position $R_1$, $R_2$ of the camera 4 is known, the three-dimensional coordinates of the points 5 can also be calculated at the above-mentioned transitions. To improve the calculation of the coordinates of a point 5, the above-mentioned steps can be run through several times with different picture pairs. For example, not only the picture, which was taken last, and the predecessor thereof can be compared to one another, but for example also the picture, which was taken last and the pre-predecessor thereof. Each of these comparisons leads to a calculation of the three-dimensional coordinate. These results are then combined by averaging or by fusioning methods, for example a Kalman filter.

The three-dimensional coordinates of the points 5 are finally entered into a map 3 of the surroundings of the processing device 1. For example a two-dimensional grid map, as illustrated in FIG. 3, can subsequently be generated from these three-dimensional coordinates. The setup of the map 3 includes a discretization of the three-dimensional coordinates of the points 5 and the projection of these points 5 in the base plane of the floor 2. Depending on the distance of the point 5 to the floor 2 (elevation of the point), it is grouped in different classes. Obstacles 7 close to the floor, which are not accessible to the processing device 1, are represented in dark grey in the map 3. These obstacles 7 have an elevation, which is smaller than or equal to the height of the processing device 1. Accessible obstacles 7 are represented in medium grey in the map 3. They have an elevation, which is larger than the height of the processing device 1. This can for example be a table top. Finally, obstacles 7 comprising a very large elevation, which is on principle constant across the entire room, are shown in light grey. These obstacles 7 are for example walls. This classification of the points 5 results in a map 3, which provides a depiction of the room, which is as realistic as possible, for the user.

The map 3 can now be displayed to the user for example on a mobile end device, such as a smart phone, a tablet or a laptop. For this purpose, the map 3 is transmitted from the processing device 1 to the end device, for example using W-LAN, UMTS, 3G, GPRS or the like. The transmission can take place directly between the processing device 1 and the end device of the user, when it is located for example in a common data network. The map 3 can moreover also be intermediately stored for re-use or for viewing on other end devices.

The user can then select a location in the map 3, which the processing device 1 is to approach in order to carry out for example a pointwise processing at that location. This can for example be the region around a table, which is to be cleaned on a regular basis at certain times. It is also possible to select certain regions, which are to be left out from processing, for example regions of the room with sensitive floor coverings, such as real hardwood floors, which are to not be processed by a processing device 1 using wet operation.

REFERENCE LIST 1 processing device
2 floor
3 map
4 camera
5 point
6 height information
7 obstacle
d distance
$R_1$ first room position
$R_2$ second room position
α angle
β angle

The invention claimed is:

1. A method for processing a floor (2) of a room using an automatically movable processing device (1), comprising the following steps:
    calculating a three dimensional coordinate within a world coordinate system for each point of a plurality of points of the room and/or of an obstacle (7) arranged in the room,
    generating a map of the room from the calculated three-dimensional coordinates, and
    displaying the map (3) to a user of the processing device (1), the map being configured so that the user can select at least one sub-region of the room in which the processing device (1) is to process or refrain from processing the floor (2),
    wherein the map (3) is displayed as two-dimensional map comprising coded, height information (6), wherein the height information (6) is height information (6) of an obstacle (7), and wherein codes of obstacles of different heights differ.

2. The method according to claim 1, further comprising measuring the room using a three-dimensionally pivotable laser distance sensor, which is arranged on the processing device (1).

3. The method according to claim 1, further comprising measuring the room with a camera (4) arranged on the processing device (1).

4. The method according to claim 3, herein a first picture of the camera (4) is taken from a first room position (R1) of the processing device (1), and wherein a second picture is taken from a second room position (R2) of the processing device (1), wherein picture data contained in the first picture and the second picture are reduced to a plurality of points (5).

5. The method according to claim 4, further comprising the step of comparing the reduced picture data of the first picture and of the second picture to one another, and wherein the step of calculating the three-dimensional coordinate of the world coordinate system takes place by means of determining a distance (d) between the first room position (R1) and the second room position (R2) covered by the processing device (1) for each point (5) and/or each line.

6. The method according to claim 5, the step of determining the distance (d) between the first room position (R1) and the second room position (R2) is accomplished using a laser distance sensor, which is arranged on the processing device (1).

7. The method according to claim 1, wherein the map (3) is displayed as grid map or line map.

8. The method according to claim 1, wherein the map (3) of the room is generated using an evaluating unit of the processing device (1).

9. The method according to claim 1, wherein the map (3) of the room is generated using an evaluating unit of a mobile end device, which is in data connection with the processing device (1), and/or using an evaluating unit, which is integrated in a data communications network.

* * * * *